United States Patent [19]

Stanley

[11] Patent Number: 4,969,233

[45] Date of Patent: Nov. 13, 1990

[54] PROCESS FOR ATTACHING A HANGER MEMBER TO A CASING

[75] Inventor: Thomas R. Stanley, Kansas City, Mo.

[73] Assignee: Teepak, Inc., Westchester, Ill.

[21] Appl. No.: 453,533

[22] Filed: Dec. 20, 1989

[51] Int. Cl.⁵ ............................................. A22C 15/00
[52] U.S. Cl. ...................................... 452/30; 53/413; 248/317
[58] Field of Search .................... 17/44.4, 44.2, 44; 383/6, 22, 24, 25; 53/413; 248/317

[56] References Cited

U.S. PATENT DOCUMENTS

| | | | |
|---|---|---|---|
| 3,401,042 | 9/1968 | Frederick et al. | 17/44.2 |
| 3,943,606 | 3/1976 | Ernst | 17/44.2 |
| 3,951,262 | 4/1976 | Niedecker | 17/44.2 |
| 4,008,912 | 2/1977 | Kotov | 289/1.2 |
| 4,044,450 | 8/1977 | Raudys et al. | 17/44.2 |
| 4,165,593 | 8/1979 | Niedecker | 53/413 |
| 4,227,668 | 10/1980 | Ernst | 248/317 |
| 4,255,833 | 3/1981 | Niedecker | 17/44.2 |

Primary Examiner—Willis Little
Attorney, Agent, or Firm—Robert P. Simpson; Michael L. Dunn

[57] ABSTRACT

A method of attaching a hanger member to a casing is provided, including the steps of inserting a portion of the hanger into an open end of the casing and then closing the open end of the casing to occlude and retain the hanger portion within the casing.

7 Claims, 1 Drawing Sheet

PROCESS FOR ATTACHING A HANGER MEMBER TO A CASING

BACKGROUND OF THE INVENTION

The invention relates generally to a process for attaching a hanger member to a casing.

Food products such as sausage and other processed meats, cheese, sandwich spreads and the like are often packaged in tubular casings which are tied or secured at both ends. It is typically desired to attach a hanger to one end of the casing. For example, a hanger is typically secured to one end of a sausage link to enable draping or looping of links about a hook or rack device during smoking and other preparatory stages of processing. At the retail level, sausages and other tubular encased food products are often stored by hanging the product from one end.

Various methods and devices have been developed and patented in an effort to solve this seemingly simple yet troublesome problem. For example, Kotov, in U.S. Pat. No. 4,008,912, discloses a self-tightening knot for tying tubular casings. The flexible strand encircles and tightens about the exterior surface of a casing. Unfortunately, methods which employ strands or cords tied externally to the casing are generally inadequate, since the casing tends to slide out of the knot, no matter how tightly the knot may be tied. The heavier the food product, the more likely it is that the casing will slip. Similarly, Niedecker, in U.S. Pat. No. 4,165,593, claims a process for attaching a hanger to a tubular wrapper which comprises tying a cord to a clip which is secured externally to an end of the wrapper. In addition to the slippage problem alluded to above, the invention of Niedecker creates a different problem, since the casing material tends to tear. Yet another alternative is proposed by Ernst, in U.S. Pat. No. 4,227,668, whereby a thermoplastic hanger member is anchored to a sausage casing by clipping a metal fastener about the casing and around serrations in the thermoplastic hanger. Once again, the hanger is clipped to only one side of the casing and tearing and slippage tends to occur.

SUMMARY OF THE INVENTION

The present invention provides a method of attaching a hanger member to a casing, including the steps of inserting a portion of the hanger into an open end of the casing and then closing the open end of the casing to occlude and retain the hanger portion within the casing.

A primary object of the invention is to provide a method of attaching a hanger member to a casing which prevents slippage of the casing from the hanger and also evenly distributes the hanging force to prevent tearing of the casing.

DETAILED DESCRIPTION OF THE INVENTION

Figure 1:
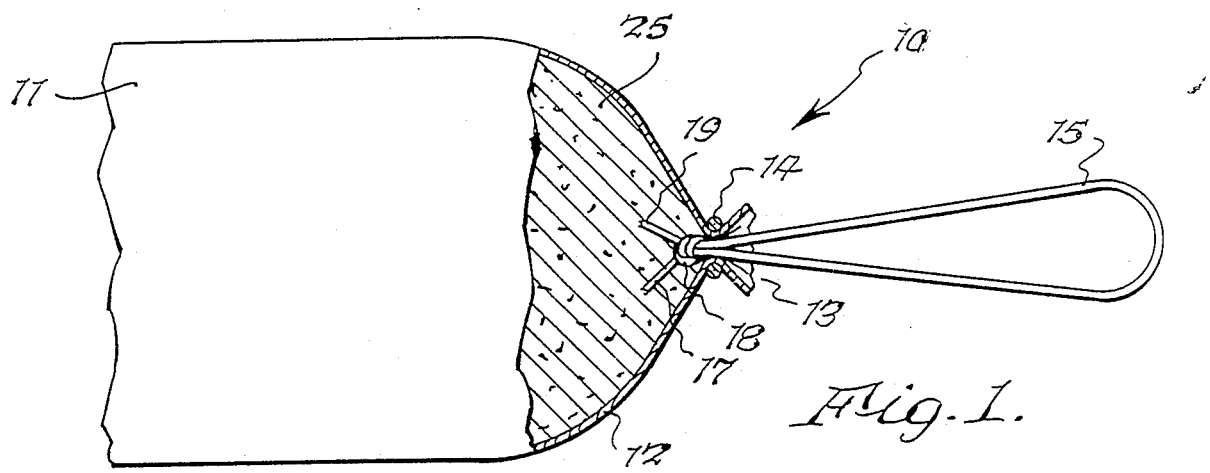
FIG. 1 shows a first embodiment of the invention wherein one end of a hanger member is formed into a knot which is occluded within a casing.

At the outset, it is to be clearly understood that the drawings are to be read together with the specification, and are to be considered a portion of the entire "written description" of this invention, as required by 35 U.S.C. 112. Also, identical reference numerals on different figures refer to identical elements of the invention.

Described herein are three embodiments of the invention which illustrate the best mode of practicing the invention known to the inventor at the time of filing an application for this patent. However, the claims are not intended to be limited in scope to the specific embodiments described herein, but are instead directed to the broader concept of attaching a hanger member to a casing by forming an occlusion of the hanger member within the casing. In this regard, it is to be recognized that the construction material and specific shape of the hanger member are not critical, as long as the shape and characteristics of the hanger member enable an occlusion to be formed within the casing.

FIG. 1 illustrates first embodiment 10 of the invention. Casing 11 is generally cylindrical in shape after filling with food product 25. Prior to filling, casing 11 includes open end 13. Hanger member 15 is shown as comprising a cord having two ends 17 and 19, respectively. In a first embodiment, ends 17 and 19 are tied to form knot 18 within casing 11. Once the knotted end of member 15 is inserted into the casing, crimped fastener 14 is crimped about open end 13 of casing 11, compressing casing skin 12 into the cords of member 15. Fastener 14 may be any conventional fastener (see, e.g., U.S. Pat. Nos. 4,308,641, 4,200,962 and 3,640,317 as but a few examples). As shown in FIG. 1, knot 18 forms an occlusion within casing 11 which prevents hanger member 15 from slipping out of the casing. Moreover, since hanger member 15 extends into the center of the casing, the stress exerted on casing skin 12 by hanging is evenly distributed.

Figure 2:
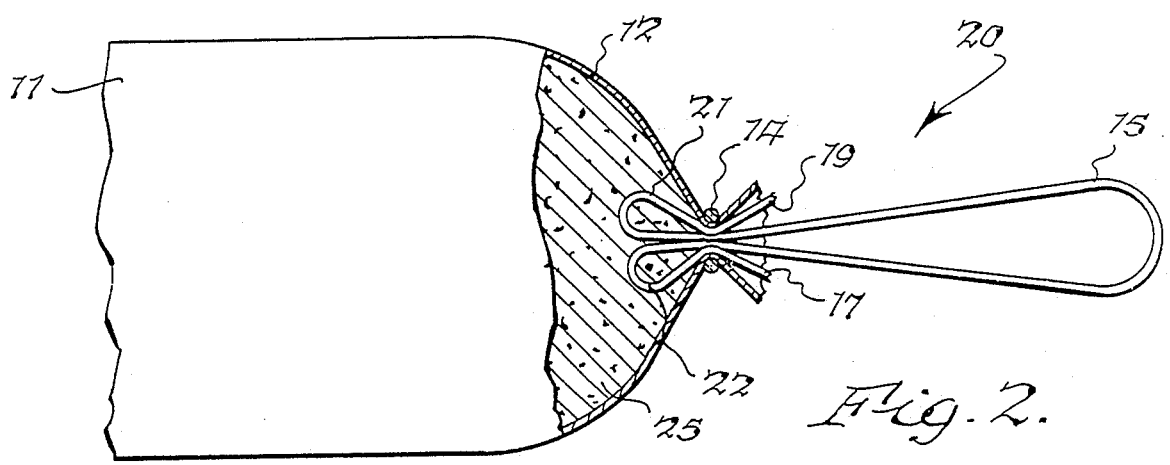
FIG. 2 shows a second embodiment of the invention wherein two ends of a member are doubled back upon themselves to form an occlusion within a casing.

FIG. 2 illustrates a second embodiment 20 of the invention where ends 17 and 19 of hanger member 15 are doubled back upon themselves to form loops 21 and 22, respectively. Loops 21 and 22 form an occlusion within the casing which prevents hanger member 15 from slipping out of the casing when the food-stuffed casing is hung.

Figure 3:
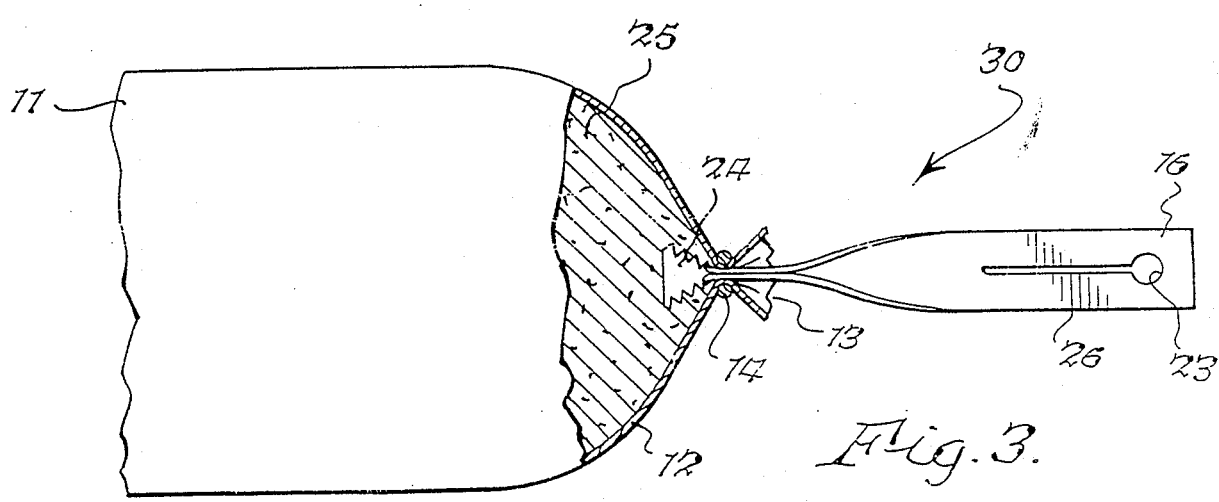
FIG. 3 shows a third embodiment of the invention wherein the hanger member comprises a plastic strip having a first end which forms an occlusion within a casing.

FIG. 3 illustrates yet a third embodiment 30 wherein hanger member 16 preferably has peripheral cutouts forming a plurality of ridges, serrations or anchor means at a first internal end 24 thereof, and an opening 23 at a second external end 26 for hanging the food-stuffed casing. First end 24 forms an occlusion within casing 11. Hanger member 16 is preferably elongate in configuration and may be constructed of thermoplastic material such as nylon or polypropylene or mylar, or of any other suitable material.

While the embodiments described above constitute preferred embodiments of this invention, it is to be understood that the invention is not limited to this precise form, and that changes may be made therein without departing from the scope of the invention as defined in the appended claims.

What is claimed is:

1. A method of attaching a hanger member to a casing, comprising:
    inserting a portion of said hanger member into an open end of said casing; and closing said open end of said casing to occlude and retain said hanger portion within the casing.

2. A method as recited in claim 1 wherein said inserting a portion of said hanger member into an open end of said casing comprises inserting at least one end of said hanger into said casing wherein said one end is formed into a knot.

3. A method as recited in claim 1 wherein said hanger comprises a cord doubled back upon itself such that an occlusion is formed by said cord within the casing.

4. A method as recited in claim 1 wherein said hanger comprises a plastic loop having a first end which forms an occlusion within said casing and a second external end for hanging said casing when it is filled with food product.

5. A method as recited in claim 1 wherein a crimped fastener is used to close said open end of said casing.

6. A device for hanging a casing, comprising:
a hanger member having a first end adapted to be occluded and retained inside of said casing and a second end external to said casing and adapted to hang said casing when it is filled with food product; and,
means for closing said casing about said first end of said hanger member.

7. An article of manufacture comprising:
a sausage casing; and
a hanger member having a first end occluded and retained within said casing and a second end external to said casing and adapted to hang said casing when it is filled with food product.

* * * * *